J. STANLEY.

Assignor, by direct and mesne assignments, to THE STANLEY CORRUGATED FIRE PROOF LATHING COMPANY.

METALLIC PLASTERING SURFACE.

No. 10,781. Reissued Nov. 2, 1886.

WITNESSES:
Thomas Hunt.
Chas. F. Wakefield.

INVENTOR
James Stanley
BY
J. H. Lindsay & Hyde
ATTORNEYS

UNITED STATES PATENT OFFICE.

JAMES STANLEY, OF NEW YORK, N. Y., ASSIGNOR, BY DIRECT AND MESNE ASSIGNMENTS, TO THE STANLEY CORRUGATED FIREPROOF LATHING COMPANY, OF NEW YORK.

METALLIC PLASTERING-SURFACE.

SPECIFICATION forming part of Reissued Letters Patent No. 10,781, dated November 2, 1886.

Original No. 290,133, dated December 11, 1883. Application for reissue filed June 23, 1886. Serial No. 206,055.

*To all whom it may concern:*

Be it known that I, JAMES STANLEY, of the city, county, and State of New York, have invented a new and Improved Metallic Plastering-Surface, of which the following is a full, clear, and exact description.

This invention relates to the use of wire-cloth as a plastering-surface in buildings in place of lath; and it consists, principally, in corrugating or forming ribs in the wire-cloth, whereby the same is stiffened and made firmer, and whereby it may be secured to the joists and studding by means of common staples or other cheap and quickly and easily applied fastenings.

Reference is to be had to the accompanying drawings, forming part of this specification, in which similar letters of reference indicate corresponding parts in all the figures.

Figure 1:
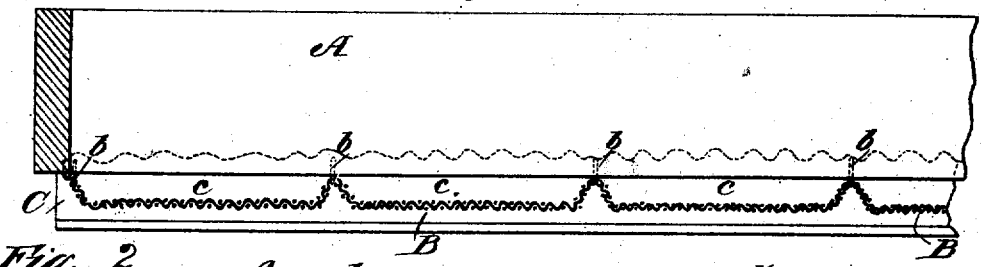
Figure 2:
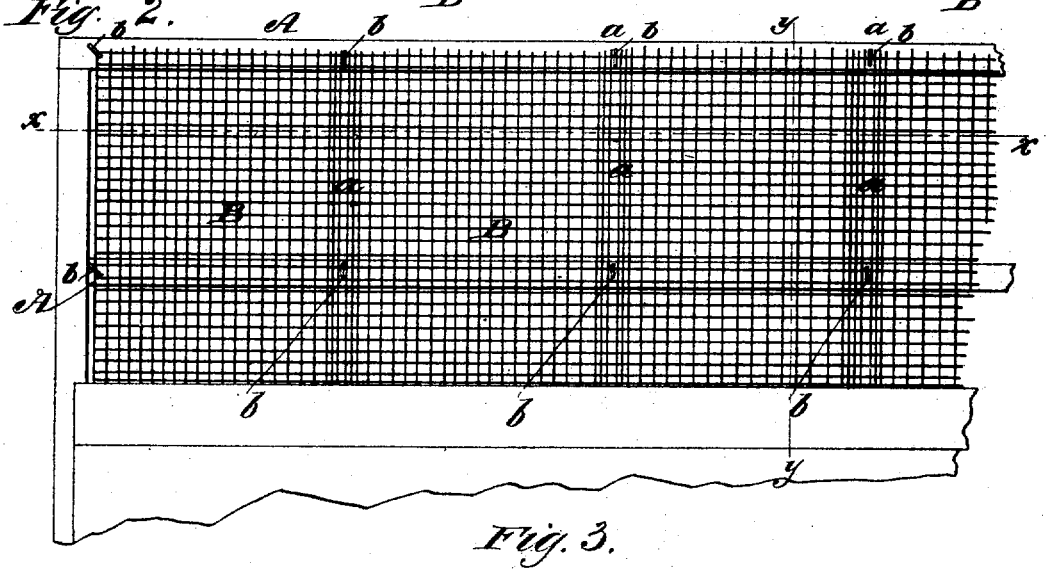
Figure 3:
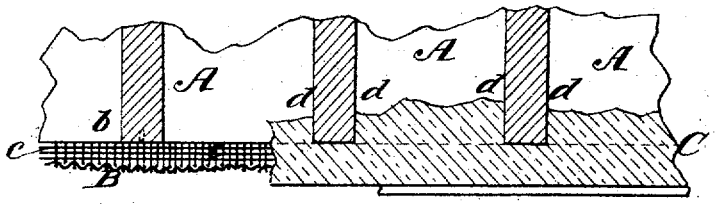
Figure 4:
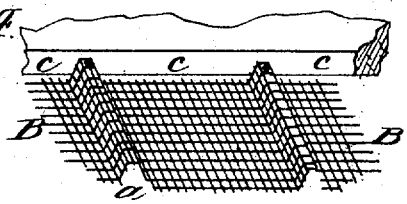

Figure 1 is a sectional elevation of a plastered wall or ceiling formed in accordance with my invention, taken on the line *x x* of Fig. 2. Fig. 2 is a front elevation showing the wire-cloth partly plastered. Fig. 3 is a sectional elevation taken on the line *y y* of Fig. 2, and Fig. 4 is a perspective view showing the wire-cloth secured to the joist or studding.

A A represent the studding or joists of a building.

B represents the wire-cloth, and C represents the plastering. The wire-cloth B is corrugated or ribbed, as shown at *a*, and is attached to the joists or studding A by the staples *b b*, passed through the wire-cloth in the corrugations, and driven into the joists or studding, and the wire-cloth is, by preference, placed upon the joist or studding in such manner that the corrugations *a* run transverse to the joist and studding, as shown in the drawings.

The corrugations insure that the cloth will remain flat in handling before and at the time of application, as herein described, and obviate the necessity of stretching. They also take the place of furring, and when the plaster is applied coat the whole structure with a uniform thickness of plaster, which is keyed throughout to the cloth even at the points of application to the beams, and acts to seal the beams in a fire-proof manner.

By corrugating the wire-cloth B, it will be seen that the staples *b*, which are cheap and quickly and easily applied, hold the wire-cloth in place with perfect security. It will also be seen that the whole body of the wire-cloth is stiffened by forming the corrugations in it, and that it is for the most part set out away from the edges of the joist and studding, as shown at *c c*, by the ribs or corrugations, so that the plaster when applied will key around and through the ribs or corrugations, and close to and around the edges of the joists and studding, as shown at *d d*, Fig. 3, thus perfectly sealing the same at the edges, so that fire cannot pass from joist to joist. Besides these advantages, the wire-cloth surface is strong and durable, and enables the plaster to be put on without showing any impression of the joist or studding, and is sufficiently rigid to prevent all sagging of the wall or ceiling.

In some cases, if found necessary, the wire-cloth may be strengthened at the ribs or corrugations by increasing the number of strands of wire at those points; or a rod might be used for that purpose, woven in with the strands of the cloth or held in place along the outside of the corrugations by the staples *b*.

Having thus described my invention, I claim as new and desire to secure by Letters Patent—

1. A metallic plastering-surface consisting of the wire-cloth B, corrugated or ribbed, and strengthened at the ribs or corrugations by extra strands or by rods, substantiallly as and for the purposes described.

2. The wire-cloth B, ribbed or corrugated, as shown at *a*, and attached to the joists or studding A by staples *b* or other fastening, the ribs *a* being arranged transverse to the joists or studding, substantially as described.

3. The combination, with beams, joists, or other equivalent supports of a building, of a flat strip or strips of corrugated wire-cloth applied without stretching, and arranged with the corrugations projecting toward the support and sealed to the support by plaster keyed through both the corrugated and uncorrugated portions, substantially as and for the purposes described.

In witness whereof I have hereto set my hand this 16th day of June, 1886.

JAMES STANLEY.

Witnesses:

ARCHIBALD C. WEEKS.
W. H. BERRIGAN.